United States Patent
Armstrong et al.

(10) Patent No.: US 10,458,364 B2
(45) Date of Patent: Oct. 29, 2019

(54) PROPULSION SYSTEM USING SUPERCRITICAL $CO_2$ POWER TRANSFER

(71) Applicants: Rolls-Royce North American Technologies, Inc., Indianapolis, IN (US); Rolls-Royce Corporation, Indianapolis, IN (US)

(72) Inventors: Michael J. Armstrong, Avon, IN (US); Igor Vaisman, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 345 days.

(21) Appl. No.: 15/273,183

(22) Filed: Sep. 22, 2016

(65) Prior Publication Data

US 2017/0082066 A1    Mar. 23, 2017

Related U.S. Application Data

(60) Provisional application No. 62/222,282, filed on Sep. 23, 2015.

(51) Int. Cl.
*F02K 5/00* (2006.01)
*F01K 23/10* (2006.01)
(Continued)

(52) U.S. Cl.
CPC ............... *F02K 5/00* (2013.01); *B64D 27/02* (2013.01); *F01K 23/10* (2013.01); *F01K 25/103* (2013.01); *F02C 1/105* (2013.01); *F02C 6/18* (2013.01); *F02C 6/206* (2013.01); *F02K 3/06* (2013.01); *F02K 3/077* (2013.01); *F02K 3/12* (2013.01); *B64D 2027/026* (2013.01); *F05D 2210/12* (2013.01); *F05D 2210/13* (2013.01);
(Continued)

(58) Field of Classification Search
None
See application file for complete search history.

(56) References Cited

U.S. PATENT DOCUMENTS 2,820,599 A    1/1958   Ackeret et al.
3,646,760 A *  3/1972   Waidelich .............. F02C 1/007
                                                         60/204

(Continued)

FOREIGN PATENT DOCUMENTS

EP    1331386 A2    7/2003
EP    3109433 A1   12/2016

OTHER PUBLICATIONS

Extended European Search Report dated Feb. 17, 2017.

*Primary Examiner* — Todd E Manahan
*Assistant Examiner* — Rodolphe Andre Chabreyrie
(74) *Attorney, Agent, or Firm* — Fishman Stewart PLLC (57) ABSTRACT

A power and propulsion system includes an air compressor, a combustor positioned to receive compressed air from the air compressor as a core stream, and a closed-loop system having carbon dioxide as a working fluid that receives heat from the combustor and rejects heat to a cooling stream. The closed-loop system configured to provide power to a fan that provides the cooling stream, and to one or more distributed propulsors that provide thrust to an aircraft.

19 Claims, 5 Drawing Sheets

(51) Int. Cl.
*F01K 25/10* (2006.01)
*B64D 27/02* (2006.01)
*F02K 3/06* (2006.01)
*F02K 3/077* (2006.01)
*F02K 3/12* (2006.01)
*F02C 1/10* (2006.01)
*F02C 6/18* (2006.01)
*F02C 6/20* (2006.01)

(52) U.S. Cl.
CPC .... *F05D 2240/40* (2013.01); *F05D 2250/311* (2013.01); *F05D 2260/213* (2013.01); *Y02T 50/675* (2013.01)

(56) References Cited

U.S. PATENT DOCUMENTS

| | | | |
|---|---|---|---|
| 6,265,453 B1 * | 7/2001 | Kennedy | C07C 1/0485 518/700 |
| 8,132,412 B2 | 3/2012 | Bennett | |
| 8,464,534 B1 | 6/2013 | Riemer | |
| 8,490,397 B2 | 7/2013 | Lehar | |
| 8,814,981 B2 | 8/2014 | Stallmann | |
| 8,869,531 B2 | 10/2014 | Held | |
| 8,887,503 B2 | 11/2014 | Sonwane et al. | |
| 8,966,901 B2 | 3/2015 | Held et al. | |
| 2005/0204723 A1 * | 9/2005 | Ouwerkerk | F01K 23/10 60/39.182 |
| 2013/0180259 A1 * | 7/2013 | Stapp | F02C 3/04 60/773 |
| 2014/0119881 A1 | 5/2014 | Kalra et al. | |
| 2015/0033737 A1 | 2/2015 | Mitri et al. | |
| 2016/0053638 A1 * | 2/2016 | Stapp | F28F 9/001 60/650 |
| 2017/0122254 A1 * | 5/2017 | Urch | B60K 6/24 |
| 2017/0350279 A1 * | 12/2017 | Kobayashi | F01K 23/10 |

* cited by examiner

PROPULSION SYSTEM USING SUPERCRITICAL $CO_2$ POWER TRANSFER

CROSS-REFERENCE TO RELATED APPLICATIONS

This application is a non-provisional application claiming priority to U.S. Provisional Application No. 62/222,282 filed Sep. 23, 2015, which is hereby incorporated by reference in its entirety.

FIELD OF TECHNOLOGY

An improved apparatus and method of operating a propulsion system includes providing power to distributed propulsors using carbon dioxide ($CO_2$) operated in super-critical cycle.

BACKGROUND

It has become increasingly desirable to increase the efficiency and reduce the size of power-producing or thrust-producing devices such as gas turbine engines. Gas turbine engines typically include one or more shafts that include compressors, bypass fans, and turbines. Typically, air is forced into the engine and passed into a compressor. The compressed air is passed to a combustor, and at high temperature and pressure the combustion products are passed into a turbine. The turbine provides power to the shaft, which in turn provides the power to the compressor and bypass fan or gearbox. Thrust is thereby produced from the air that passes from the bypass fan, as well as from the thrust expended in the turbine combustion products. This system is typically packaged together with power production and thrust generation co-located.

However, air can be thermodynamically inefficient, especially during high altitude operation of the engine (such as in an aircraft application). Air that enters the engine is of low pressure, therefore low density. In order to reach the needed pressure and temperature at the combustor exit, the air is compressed to very high pressure ratios and heated up to very high temperatures in the combustors. In order to provide adequate mass flow rate, significant volume flow rate of the low density air is pumped through high pressure ratio consuming significant amount of power. As a result the engines are made of large and heavy components, consume large amount to fuel, and may include significant operational and maintenance expenses to cope with high combustion temperatures.

To increase system efficiency and reduce component size and complexity of turbomachinery, some power-producing or thrust-producing use a closed cycle super-critical carbon dioxide (s-$CO_2$) system. This system provides significantly improved efficiencies compared to Brayton and other air-based systems by operating in a super-critical region (operating at a temperature and pressure that exceed the critical point). That is, a phase-diagram of $CO_2$, as is commonly known, includes a "triple point" as the point that defines the temperature and pressure where solid, liquid, and vapor meet. The critical point is the top of the dome made up of the saturated liquid and saturated vapor lines. Above the critical point is the gaseous region. At the triple point the fluid can exist in liquid, vapor, or in a mixture of the both states. However, at higher temperature and pressure, a critical point is reached which defines a temperature and pressure where gas, liquid, and a super-critical region occur.

Fluids have a triple point, a critical point, saturated liquid and vapor lines, and a super-critical region. One in particular, carbon dioxide, is particularly attractive for such operation due to its critical temperature and pressure of approximately 31° C. and 73 atmospheres, respectively, as well as due to its lack of toxicity. Thus, s-$CO_2$-based systems may be operated having very dense super-critical properties, such as approximately 460 $kg/m^3$. The excellent combination of the thermodynamic properties of carbon dioxide may result in improved overall thermodynamic efficiency and therefore a tremendously reduced system size. Due to the compact nature and high power density of a power source that is powered with a super-critical cycle, the overall size of engine may be significantly reduced, as well.

Aircraft typically include one or two propulsion systems placed on each wing or integrated the aft fuselage or tail. Their placement is based at least in part on the size of the thrust-producing devices, such as gas turbine engines, in which air is traditionally used as the working fluid. However, typical propulsion systems are sized to account for a mis-match between the LP shaft speed of the engine and the desired speed of the propulsor. Not only does this result in conversion inefficiencies, but additional mass as well. Distributed propulsion is a method which addresses this sizing mismatch by decoupling the propulsor from the power shaft and integrating it more closely with the air vehicle for aerodynamic improvement. This also allows for higher bypass ratios, and air vehicle lift or drag augmentation.

As such, there is a need to improve overall propulsion efficiencies and reduce mass employing a s-$CO_2$ operation.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine is described herein, and various embodiments thereof. According to the disclosure, a gas turbine engine uses a power source to provide power to the shaft, while providing adequate power and thrust for aircraft and other purposes.

Various applications include, as examples, a turbojet, a turbofan, adaptable, turboprop and turboshaft engine configurations. The turbojet derives most of its thrust from the core stream and is generally most advantageous in high altitude and/or high mach regimes. Turbojets bypass minimal airflow around the core so they tend to be smaller diameter, noisy and drag efficient. The turbofan, on the other hand, derives most of its thrust from the bypass stream which offers advantages in fuel savings mostly in subsonic applications. Turbofans bypass a high amount of airflow around the core and appear larger in diameter. Because of the larger fan turning more slowly they produce less noise than a turbojet.

Turboprop engines characteristically attach a turbine engine to drive a propeller instead of a fan. Because propellers typically turn more slowly because of their larger diameter, a gearbox may be provided between the turbine engine and the propeller. In a turboshaft application, the turbine connects to something other than a fan or propeller, often a helicopter rotor or shaft in a marine application. Turboshafts typically include a gearbox between the turbine engine and rotor or shaft.

Figure 1:
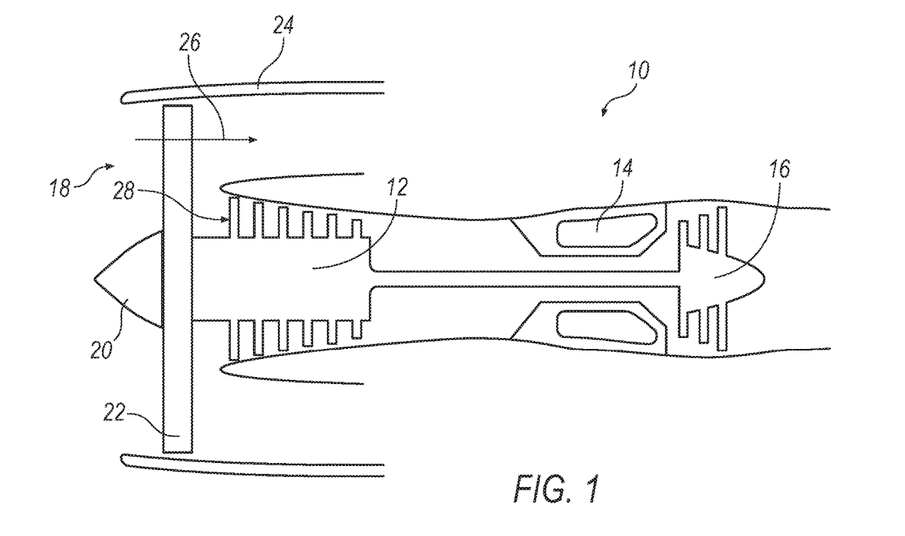
FIG. 1 is an illustration of a conventional gas turbine engine.

FIG. 1 illustrates an exemplary schematic diagram of a gas turbine machine 10 that is a primary mover or thrust source for an aircraft. The turbine machine 10 includes a primary compressor 12, a combustor 14 and a primary turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12. The engine provides two major functions: propulsion and power generation used to rotate the compressors, turbines, and the bypass fan. The major function, propulsion, includes fairly low air pressures and temperatures, which are approximately equal to the pressures and temperatures exiting the gas turbine engine. However, the air pressure ratios and temperatures generated in the gas turbine engine are relatively very high. The high pressure ratios and temperatures are needed to provide the power generation function A closed-loop system in this regard refers to a power-producing circuit that includes its own working fluid, such as a s-$CO_2$ system, and which operates in compression, expansion, and heat rejection in a closed-loop analogous to a closed-loop refrigeration system. That is, aside from incidental leakage of the working fluid, the working fluid does not otherwise contact the external environment during operation.

Thus, in general, a power-producing device includes an inner housing for passing a core stream of air, the inner housing houses a first shaft coupled to a first turbine and a first compressor, a second shaft coupled to a second turbine and a second compressor, a third shaft coupled to a third turbine and a fan assembly, a combustor positioned to receive compressed air from the second compressor, and a heat rejection heat exchanger configured to reject heat from a closed-loop system. The closed-loop system includes the first, second, and third turbines and the first compressor and receives energy input from the combustor.

Figure 2:
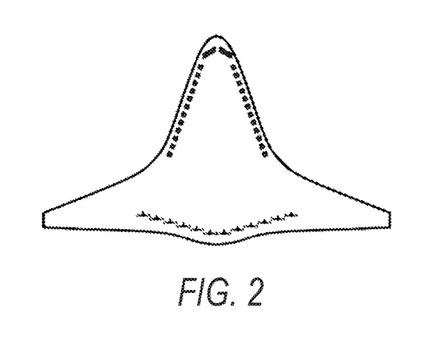
FIG. 2 is an illustration of an exemplary air vehicle having a distributed propulsion.
Figure 3:
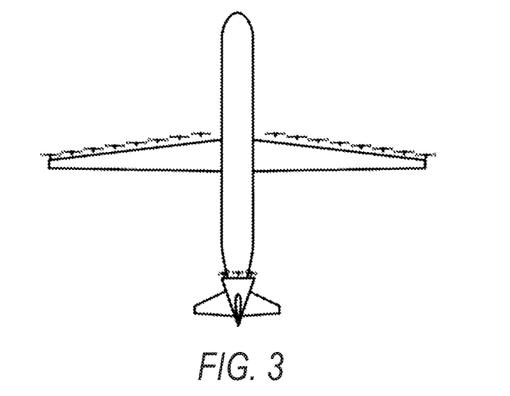
FIG. 3 is an illustration of an exemplary air vehicle having a distributed propulsion.

FIGS. 2 and 3 illustrate exemplary air vehicles having distributed propulsion. FIG. 2, in one example, illustrates a blended wing body aircraft which is a fixed-wing aircraft having no clear dividing line between wings and the main body of the aircraft. FIG. 3, in another example, illustrates a more conventional aircraft having two wings extending from a traditional fuselage. Both examples benefit from a distributed propulsion system as disclosed herein, in that one or a few essentially point sources of thrust obtained in more conventional designs are replaced having numerous distributed propulsors.

Figure 4:
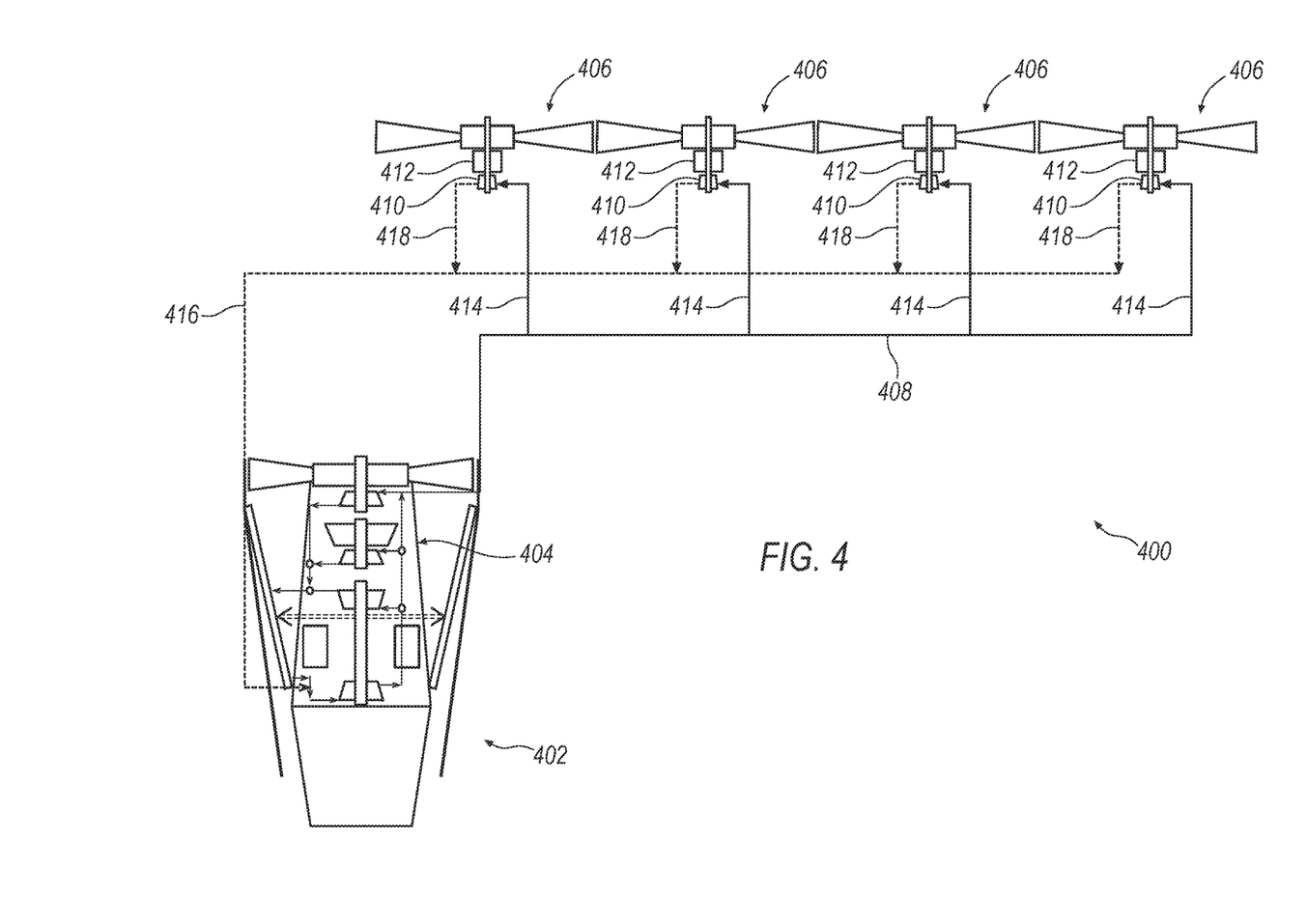
FIG. 4 is an illustration of spatial separation of multiple propulsors driven by a s-$CO_2$ combustion cycle.

FIG. 4 is an illustration of spatial separation of multiple propulsors driven by a s-$CO_2$ combustion cycle, according to one exemplary embodiment. System 400 includes a power-producing device 402 having a closed-loop system 404. Typically, as will be further illustrated with respect to FIG. 7, closed-loop system 404 provides power to a turbine that is physically positioned within power-producing device 402, which is used to power a fan or turboprop that is also positioned within power-producing device 402.

However, as shown in FIG. 4, power may be extracted to one or more propulsors 406 that are distributed and remote from power-producing device 402. That is, working fluid (carbon dioxide in this example) passes from closed-loop system 404 via a supply manifold 408 and provides power via expansion of the working fluid to each of propulsors 406 via respective turbines 410. In the example illustrated, each propulsor 406 includes a gear drive 412 that changes rotational speed of each respective shaft between turbines 410 and their respective fan blades. However, in an alternate arrangement, one or more gear drives 412 may be eliminated if, for example, there is no desire or need to alter rotational speed as provided by the respective turbine 410.

As shown, each propulsor 406 is powered in parallel by extracting the working fluid in parallel via supply lines 414. After passing through each respective turbine 410, the working fluid passes to a return manifold 416 via return lines 418. Accordingly, because power extraction is in parallel, temperature and pressure of the working fluid is essentially the same as it is provided to each supply line 414, and pressure drop is essentially the same in each turbine 410. In such fashion, each propulsor 406 is provided with working fluid at essentially the same condition, such that power provided to each propulsor 406 is essentially uniform. It is contemplated, however, that an alternate embodiment may include some or all propulsors having a serial arrangement, in which case a pressure drop may occur between supply lines (such as lines 414).

As such, no conversion equipment is necessary to provide the fluidic power distribution. Instead, each propulsor 406 is driven by expansion of the cycle's working fluid, and speed control of each respective propulsor may be controlled by individual drive gears 412. Accordingly, conversion inefficiencies are reduced and overall mass of conversion equipment is reduced as well, in that one power-producing device 402 provides power to multiple propulsors 406.

Figure 5:
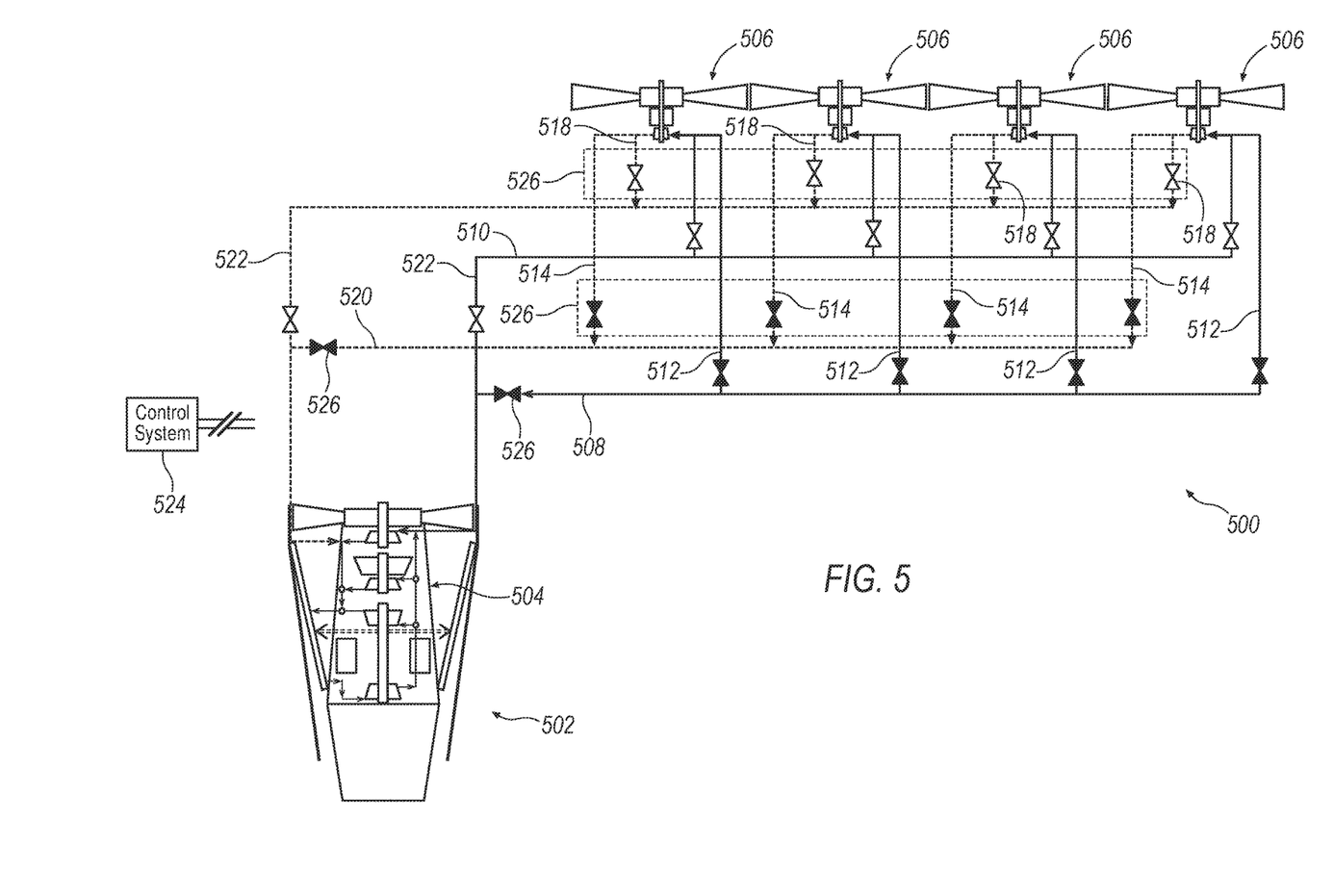
FIG. 5 is an illustration of spatial separation of multiple propulsors having a fault isolation and recovery capability through isolation and redundancy.

FIG. 5 illustrates a distributed propulsor system 500, as described in FIG. 4, having a power-producing device 502 having a closed-loop system 504. However, system 500 includes distribution redundancy and reconfigurability that can be achieved via parallel distribution paths and isolation valves to isolate portions of the system to support a fail-safe operation.

System 500 includes multiple propulsors 506 that are supplied by a first supply manifold 508 and a second supply manifold 510. Each supply line 508, 510 includes respective supply lines 512, 514 that are separably controllable via respective supply isolation valves 516, 518. Redundant return manifolds 520, 522 are also included, having return lines to each from propulsors 506 which may separably isolated via respective isolation valves in the return lines, as illustrated.

Accordingly, system 500 not only provides redundant supply manifolds, but includes redundant supply lines having their own individual control capability. In operation, it may be desirable to operate both supply and/or return manifolds simultaneously, or it may be desirable to operate only one of them during operation. Regardless, in the event of a fault in one of the propulsors, one of the supply manifolds, one of the supply lines, or one of the return manifolds or lines, then such fault may be isolated from the system without negative impact to other portions of the system. For instance, if one of propulsors 506 develops a fault, it may be isolated via proper operation of the isolation valves, and the other propulsors 506 may continue operation. In another example, if one of the supply or return lines or manifolds develops a fault, then the fault may be isolated from operation and all propulsors 506 may continue in safe operation until the aircraft is safely returned for repair.

It is contemplated that system 500 (and subsequently described systems disclosed herein), includes a control system or computer 524 that may be used to operate each or the isolation valves illustrated or described herein. As such, control system 524 may be operated to maintain pressures throughout the system and to coordinate opening and closing of isolation valves to ensure a proper mass flow throughout. For instance, in the event of a failure in a return path, isolation valves identified with element 526 may be closed via controller 524 to isolate the faulty return path.

Figure 6:
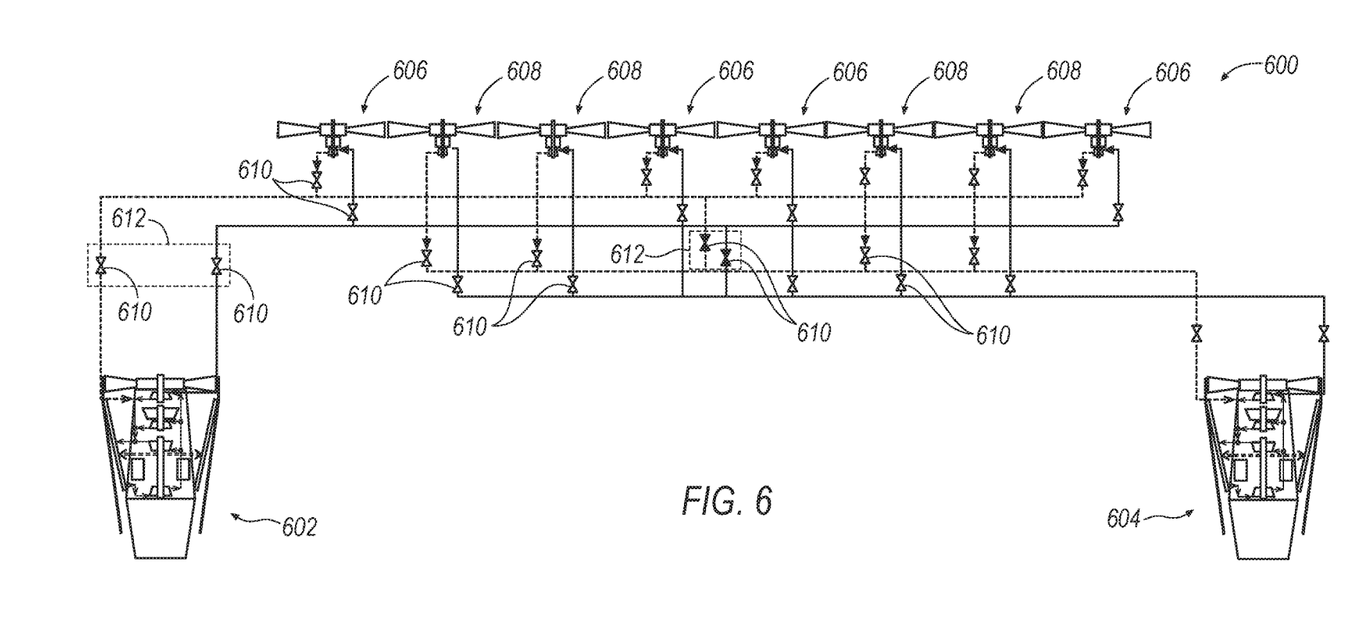
FIG. 6 is an illustration of spatial separation of multiple propulsors having a redundant power distribution system.

FIG. 6 illustrates a distributed propulsor system 600 having yet further redundant capabilities for fault isolation and safe operation. System 600 includes a first power-producing device 602 and a second power-producing device 604. As shown, each system 602, 604 provides power to respective banks of propulsors 606, 608, and as also described above, each bank of propulsors includes their own respective and redundant supply manifolds and supply lines, as well as return manifolds and return lines. Nominally, power-producing device 602 provides power, as describe above via a closed-loop system, to propulsors 606. Additionally, power-producing device 604 provides power, as describe above via a closed-loop system, to propulsors 608

Accordingly, redundancy is provided not only in the ability to isolate individual propulsors 606, 608, but in the event of a catastrophic failure of one of devices 602, 604, the failed device 602, 604 may be isolated from operation while the other and operational device 602, 604 may continue safe operation until the aircraft can be safely landed for repair.

As such, isolation valves 610 may be used to isolate individual propulsors, or may be used if selectively controlled to isolate individual manifolds or even an entire power-producing device from the rest of the system. In one example, isolation valves identified as elements may be used to isolate device 602 from operation, in the event of a failure of device 602.

Each system 400, 500, 600 described above includes a respective power-producing device 402, 502, and 602/604. Each power-producing device 402, 502, and 602/604 is illustrated having a particular arrangement that is described with respect to FIG. 7 below. However, it is contemplated that illustrated power-producing devices 402, 502, and 602/604 other exemplary engine arrangements having a closed-loop system may be employed.

Figure 7:
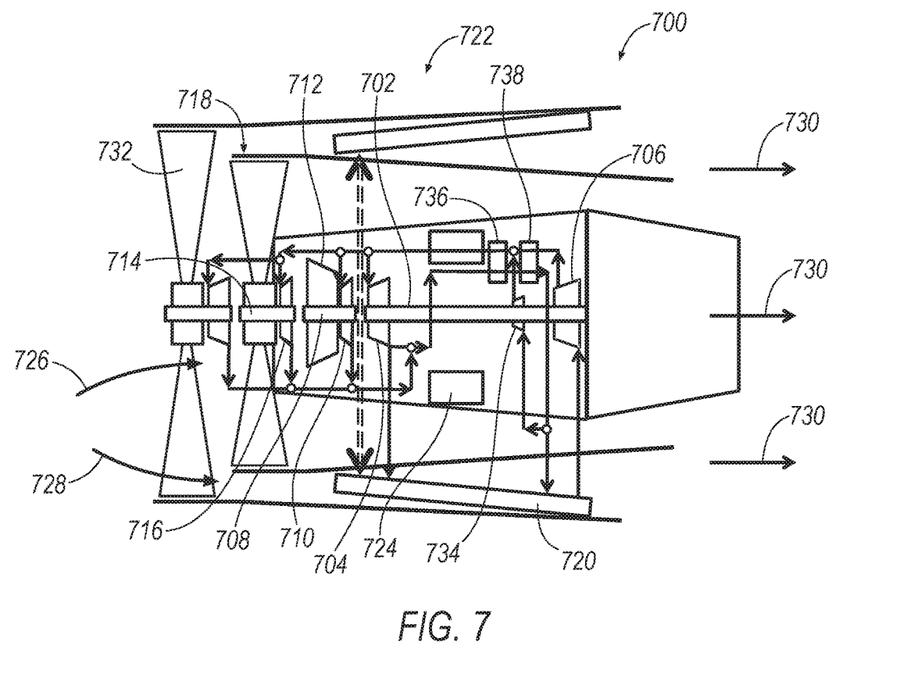
FIG. 7 is an illustration of an exemplary gas turbine having a turbofan and multiple rotational shafts and a closed-loop system power-producing circuit.

FIG. 7 is an illustration of an exemplary gas turbine or turbofan 700 having multiple rotational shafts and a closed-loop system power-producing circuit that includes its own working fluid, such as a s-$CO_2$ system, which may be implemented in any one of the preceding exemplary embodiments. Turbofan 700 may be used, as will be further described and illustrated, to provide power via its s-$CO_2$ system to distributed propulsors. Turbofan 700 includes a first shaft 702 coupled to a first turbine 704 and a first compressor 706. A second shaft 708 is coupled to a second turbine 710 and a second compressor 712. A third shaft 714 is coupled to a third turbine 716 and a fan assembly 718. A heat rejection heat exchanger 720 is configured to reject heat from a closed-loop system 722 with air passed from fan assembly 718. In one example closed-loop system 722 includes carbon dioxide as a working fluid and is configured to operate as a super-critical (s-$CO_2$) system. A combustor 724 is positioned to receive compressed air from the second compressor 712 as a core stream 726. The closed-loop system 722 includes the first, second, and third turbines 704, 710, 716 and the first compressor 712, and receives energy input from the combustor 724. A bypass airflow 728 is also generated from a fan assembly 732, causing air to flow across heat rejection heat exchanger 720, and combustion products from combustor 724 (resulting from combustion that results in part from core stream 726) and bypass airflow 728 both produce a thrust 730 for turbofan 700.

First compressor 706 of closed-loop system 722 is coupled to shaft 702 for compressing the working fluid, and turbine 704 expands the working fluid to extract the power therefrom. In operation, combustor 724 provides power input to the working fluid of closed-loop system 722, which in turn is expanded (and energy extracted therefrom) by turbines 704, 710, 716 before heat is rejected in heat rejection heat exchanger 720. The working fluid is compressed in compressor 706 before entering combustor 724. In the example illustrated, to improve efficiency turbofan 700 may include a re-compression compressor 734, and a low temperature recuperative heat exchanger 736 and a high temperature recuperative heat exchanger 738.

Operation of the components within closed-loop system 722 may be optimized by maximizing component efficiency by tailoring rotational speeds of each. For instance, fan assembly 718 typically operates at a speed much lower than that of compressors and turbines. In addition, however, compressor 712 operates to compress air for core stream 726 for combustion in combustor 724. Whereas compressor 706 is within closed-loop system 722 and is therefore configured to compress carbon dioxide as closed-loop system 722 operates in super-critical mode. Accordingly, first, the second, and the third shafts 702, 708, 714 are separately operable at different speeds from one another, and therefore operable according to their respective optimal design speeds. Further, according to one example, although shaft 714 coupled to fan assembly 718 is separately operable, a rotational speed of fan assembly 718 may be further reduced by use a gear 732 that is coupled between shaft 714 and fan assembly 718. Accordingly, gear 732 reduces a rotation of a fan blade within the fan blade assembly relative to a rotational speed of the shaft 714.

Turbofan 700 includes an inner housing 732 that houses at least a portion of the first, second, and third shafts 702, 708, 714, and passes air therethrough from fan assembly 718 to combustor 724, and bypass air 728 passes from fan assembly 718 and as bypass air 728 passes externally to inner housing 734 to provide cooling to heat rejection heat exchanger 720. Thrust 730 is thereby provided from both combustion byproducts from combustor 724 and from bypass air 728.

Thus, FIG. 7 illustrates a s-$CO_2$ driven turbofan with independently driven compression and propulsion devices. There are two compression devices illustrated in this cycle: a low pressure (LP) compressor 712 and s-$CO_2$ compressor 704. Compressor 712 provides core air 726 to combustor 724 and s-CO$_2$ compressor 706 provides the pressure rise which drives the s-CO$_2$ power cycle. The propulsion element is a single stage fan assembly 718 which provides aircraft thrust as well as provides air flow across the heat exchange to the support power cycle.

This engine employs a sCO2 power generation system. It includes a CO$_2$ compressor, a heat absorption heat exchanger integrated with the combustor, an expander, and the heat rejection exchanger built-in in the annular cross-section shaped by the nacelle and the baffle. The CO$_2$ compressor, the CO$_2$ expander, the fan assembly, and the air compressor are placed on the same shaft. The net power generated by the s-CO2 cycle is used to drive the fan and the low pressure air compressor.

With each of these devices operating on an independent shaft, the task of speed matching for each of the devices is simplified. The speed for each compressor/turbine or fan/turbine shaft can be selected to optimize the performance of each set of components. This will lead to a more flexibility in propulsion system design and a more efficient s-CO$_2$ cycle.

Turbofan 700 is one example of a power source having closed-loop system 722 which operates having a working fluid that operates as a s-CO$_2$ system. It is contemplated that other engine arrangements may be employed as well to provide power for distributed propulsors. In one alternative example, for instance, one or more of shafts 702, 708, and 714 may be combined as a single shaft.

And, although heat rejection heat exchanger 720 is shown in FIG. 7 as being positioned at an angle with respect to bypass airflow 728 (to enhance heat transfer therethrough), it is contemplated that in another example heat rejection heat exchanger 720 may be positioned closer to inner housing 734 to make a more compact overall arrangement while taking into account the impact on the ability to reject heat using heat rejection heat exchanger 720.

Other exemplary arrangements contemplated may include multiple fan assemblies, such as fan assembly 718, or a closed-loop system 722 having recuperative heat exchangers to provide overall improved thermodynamic efficiency. Accordingly, a distributed propulsor system as will be further described may employ Thus, in operation, a method of providing power via one or more gas turbine engines includes providing cooling to a heat rejection heat exchanger via a fan that provides a cooling stream, wherein the heat rejection heat exchanger cools a working fluid within a closed-loop system, and distributing power to one or more distributed propulsors from the closed-loop system via the working fluid, to provide thrust to an aircraft.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A power and propulsion system, comprising:
an air compressor;
a combustor having an internal heat exchanger and positioned to receive compressed air from the air compressor as a core stream;
a closed-loop system having carbon dioxide as a working fluid that receives heat from the combustor and rejects heat to a cooling stream, the closed-loop system configured to:
pass the carbon dioxide through the internal heat exchanger of the combustor to a closed loop turbine, wherein the closed loop turbine provides power to a fan that provides the cooling stream; and
pass the carbon dioxide through the internal heat exchanger of the combustor to at least two propulsor turbines that are associated with distributed propulsors, to provide thrust to an aircraft;
a first shaft having the closed loop turbine as a first turbine that receives power in the closed loop system, the first shaft including the fan;
a second shaft having a second turbine that receives power in the closed loop system, the second shaft including the air compressor; and
a third shaft having a third turbine that receives power in the closed loop system from the combustor via the carbon dioxide, the third shaft including a carbon dioxide compressor that receives the carbon dioxide from a heat rejection heat exchanger that rejects the heat to the cooling stream.

2. The power and propulsion system of claim 1, wherein the closed-loop system is configured to:
reject heat to the cooling stream via the heat rejection heat exchanger; and
provide the carbon dioxide exiting the combustor for the third turbine driving the carbon dioxide compressor and for additional propulsor turbines associated with additional distributed propulsors.

3. The power and propulsion system of claim 1, wherein the distributed propulsors are positioned removed from a power-producing device that includes the air compressor, the combustor, the closed loop turbine of the closed-loop system.

4. The power and propulsion system of claim 3, wherein the closed-loop system includes a first supply manifold and a first return manifold, and each propulsor of the distributed propulsors includes a respective supply line and return line in fluid communication with the respective first supply manifold and first return manifold.

5. The power and propulsion system of claim 4, wherein the distributed propulsors are arranged in parallel with one another via the first supply manifold and the first return manifold.

6. The power and propulsion system of claim 4, further comprising:
a second supply manifold and a second return manifold that provides redundant supply and return of the carbon dioxide to the distributed propulsors; and
an isolation valve that is configured to isolate one of the distributed propulsors from one of the supply manifolds, return manifolds, supply lines, and return lines.

7. The power and propulsion system of claim 4, further comprising a second closed loop turbine having its own closed-loop system to provide power to a different set of propulsors that are different from the distributed propulsors.

8. A method of providing power via one or more gas turbine engines, comprising:
providing cooling to a heat rejection heat exchanger via a fan that provides a cooling stream, wherein
the heat rejection heat exchanger cools carbon dioxide within a closed-loop system;

receiving power from the carbon dioxide in a first turbine of the closed-loop system, the first turbine having a first shaft driving the fan;

receiving power from the carbon dioxide in a second turbine of the closed-loop system, the second turbine having a second shaft driving an air compressor to provide compressed air to a combustor;

receiving power from the carbon dioxide in a third turbine of the closed-loop system, the third turbine having a third shaft driving a carbon dioxide compressor that receives the carbon dioxide from the heat rejection heat exchanger that rejects the heat to the cooling stream and that provides compressed carbon dioxide;

passing the compressed carbon dioxide from an internal heat exchanger of the combustor to at least two distributed propulsors of the closed-loop system, to provide thrust to an aircraft; and exchanging heat, via the carbon dioxide, from the internal heat exchanger of the combustor to the cooling stream.

9. The method of claim 8, wherein passing the carbon dioxide further includes distributing power via the at least two distributed propulsors that are positioned removed from a power-producing device that includes the air compressor, the combustor, and one or more turbines and compressors of the closed-loop system.

10. The method of claim 9, wherein the closed-loop system includes a first supply manifold and a first return manifold, and each propulsor of the at least two distributed propulsors includes a respective supply line and return line in fluid communication with the respective first supply manifold and first return manifold.

11. The method of claim 10, wherein the at least two distributed propulsors are arranged in parallel with one another via the first supply manifold and the first return manifold.

12. The method of claim 10, providing a redundant supply and return of the carbon dioxide to the at least two distributed propulsors via a second supply manifold and a second return manifold.

13. The method of claim 12, further comprising isolating one of the at least two distributed propulsors from one of the first and second supply manifolds, first and second return manifolds, supply lines, and return lines via an isolation valve.

14. The method of claim 12, further comprising providing power to a different set of propulsors that are different from the at least two distributed propulsors via a second gas turbine having its own closed-loop system.

15. A power-producing device, comprising:
a closed-loop system having carbon dioxide as a working fluid operated in super-critical mode, the closed-loop system configured to:
pass the carbon dioxide from an internal heat exchanger of a combustor to a closed loop turbine, wherein the closed loop turbine provides power to a fan that provides A cooling stream;
pass the carbon dioxide from the internal heat exchanger of the combustor to at least two propulsor turbines that drive respective distributed propulsors, to provide thrust to an aircraft;
receive power in a first turbine on a first shaft of the closed-loop system, the first shaft including the fan;
receive power in a second turbine on a second shaft of the closed-loop system, the second shaft including an air compressor; and
receive power from the combustor via the carbon dioxide and in a third turbine that is on a third shaft of the closed-loop system, the third shaft including a carbon dioxide compressor that receives the carbon dioxide from a heat rejection heat exchanger that rejects the heat to the cooling stream.

16. The power-producing device of claim 15, wherein the distributed propulsors are positioned removed from the power-producing device that includes the air compressor, the combustor, and one or more turbines and compressors of the closed-loop system.

17. The power-producing device of claim 16, wherein the closed-loop system includes a first supply manifold and a first return manifold, and each propulsor of the distributed propulsors includes a respective supply line and return line in fluid communication with the respective first supply manifold and first return manifold.

18. The power-producing device of claim 17, wherein the distributed propulsors are arranged in parallel with one another via the first supply manifold and the first return manifold.

19. The power and propulsion system of claim 1, wherein the fan also provides thrust to the aircraft.

* * * * *